United States Patent [19]

Aharon

[11] Patent Number: 5,459,565
[45] Date of Patent: Oct. 17, 1995

[54] LASER BEAM ANALYZER

[75] Inventor: Oren Aharon, Haifa, Israel

[73] Assignee: Duma Optronics, Ltd., Nesher, Israel

[21] Appl. No.: 267,529

[22] Filed: Jun. 29, 1994

[30] Foreign Application Priority Data

Aug. 20, 1993 [IL] Israel ......... 106747

[51] Int. Cl.⁶ .......... G01J 1/00
[52] U.S. Cl. .......... 356/121
[58] Field of Search .......... 356/121; 359/425, 359/426, 431

[56] References Cited

U.S. PATENT DOCUMENTS

| | | | |
|---|---|---|---|
| 2,704,009 | 3/1955 | Haeseler | 359/426 |
| 4,173,398 | 11/1979 | Okamoto et al. | 356/128 |
| 5,064,284 | 11/1991 | Johnston, Jr. et al. | 356/121 |
| 5,069,527 | 12/1991 | Johnston, Jr. | 359/823 |
| 5,078,491 | 1/1992 | Johnston, Jr. | 356/121 |

OTHER PUBLICATIONS

International Oraganization for Standardization. "Optics and optical instruments Tests methods for laser beam parameters: Beam widths, divergence angle and beam progagation factor." Document ISO/TC 172/SC 9/WG 1N 56. 26 Nov. 1993.

*Primary Examiner*—Richard A. Rosenberger
*Attorney, Agent, or Firm*—Browdy and Neimark

[57] ABSTRACT

A light or laser beam analyzer uses a rotating drum with circumferential knife-edges or slits that interrupt the beam. Inside the drum is a light intensity detector, connected to a processor which reconstructs the beam waist parameters based upon the cut profiles. The knife-edges or slits are disposed at three or more different angles to the drum rotation axis. An attenuation filter is removably mounted inside the drum, where it introduces no distortion into the light measurement. The beam is diverted from the beam line and brought to the drum by a retro-reflector which is slidably mounted along a track parallel to the beam line. The folded path allows the use of a long-focal length lens such as a simple plano-convex type. The lens is demountable for making direct measurements, and an opening is provided in the drum for passing the unfocused beam through onto the detector.

14 Claims, 5 Drawing Sheets

LASER BEAM ANALYZER

FIELD OF INVENTION

The present invention relates to the field of optical testing instrumentation and more specifically concerns testing laser systems and collimated light sources.

BACKGROUND OF THE INVENTION

Designing, building or using laser based systems requires instrumentation for measuring the laser beam characteristics. It would be particularly desirable to provide an instrument for simultaneous measuring of various beam parameters, such as: spatial propagation of a Laser Beam; degree of collimation; optical power; optical power noise; beam intensity profile across the transverse area of the beam at any selected position; and beam intensity distribution across the transverse plane.

These parameters are further explained herein.

Spatial propagation of a laser beam: Following recent developments in the laser theory, pioneered by A. E. Siegman, a laser beam is comprised of higher modes. Its spatial propagation formula can be described by the formula:

$$W_{(z)} = W_O \sqrt{1 + (M^2 \lambda/\pi W_O^2)^2 (Z - Z_O)^2} \quad \text{A)}$$

where $W_z$ is the beam radius at the waist, located at a distance Z along the arbitrary XYZ axis system, $M^2$ is a multi-mode beam quality parameter and k is the laser wavelength.

For a perfect Gaussian beam $M^2 = 1$. The above formula is appropriate for laser beams which are circularly symmetric about their propagation axis. A similar formula can be developed for the general case, where the beam is astigmatic and has an elliptical cross-section.

Degree of Collimation: Light of laser beams travels through space in straight lines, having an optical cone diverging from or converging off the light source.

The amount of divergence/convergence defines the degree of beam collimation, a parameter which is very important for beam characterization.

Optical power: The amount of incident light power inside the beam.

Optical power noise: Variations in power stability as a function of time.

Beam intensity profile across the transverse area of the beam, at a preselected position: Light distribution in a plane across the laser beam propagation, when scanned in one direction.

Beam intensity distribution across the transverse plane: Two dimensional mapping of beam intensity across the beam.

Much effort has been dedicated towards a standardization of beam width measurements, beam divergence (collimation) and beam propagation factor (M2), which were summarized in an ISO (International Organization for Standardization) proposal for working draft, ISO/TC172/SC9 WG1, Project 2, Document N38 Revised. The IS0 publication describes three standards for measuring beam parameters:

A Standard: Moving Slit Scan Method
B Standard: Moving Knife-Edge Method
C Standard: Variable Aperture Method U.S. Pat. Nos. 5,078,491 to Johnston, 5,069,527 to Johnston et al, and 5,064,284 to Johnston et al, (the '284 patent) teach measurement of laser beam quality. These patents describe laser beam analyzers which measure laser beams as to their mode composition and other qualities. The laser beam is brought to a focus by a lens (32, 132, 532, or 632 in the '284 patent), creating a transformed beam waist a distance f away from the lens, where f is the focal length of the lens. The lateral power profile of the beam is taken at various points along the beam in the region of the transformed waist to find the $M^2$ parameter of the beam. The beam profiles are obtained by chopping the beam with a moving knife edge or straight edge and recording the eclipse profile with a detector placed in the beam beyond the chopper.

The eclipse profile is the power of the beam, incident on the detector, as a function of time. The mode composition and parameter $M^2$ can be obtained, by simple conventional tomography, from this profile. The Johnston system chops the beam with a rotating drum or hub (34, 134, 534, or 634 in the '284 patent) whose cylindrical side contains an aperture (36, 136, etc. in the '284 patent). The aperture is bordered by the knife edges which cut the beam as the hub spins on its axis. Across the hub from the aperture is an opening or window (38, etc.) which is larger than the aperture to allow the beam to shine through the hub 34 onto the detector 30.

One of the applications of the Johnston invention is to measure the $M^2$ parameter at various places along a beam line in order to find out which optical components are misaligned or faulty; such components lower the $M^2$ value. To do this, the device must be installed in the beam line between the component under test and the next component down the beam line. However, the Johnston device is rather long, and thus may be difficult to insert in between optical components which are quite inconvenient to move once they are aligned.

There are two main reasons for the length of the Johnston device: first, in operation the lens 32 must be moved a distance along the beam line at least as great as the diameter D of the hub 34 (see the '284 patent at column 24, lines 42–47) and generally equal to half of the focal length f of the lens 32 (see the '284 patent at column 28, line 30); second, the detector 30 is placed beyond the hub 34, so that the Johnston apparatus must accommodate the focal length of the lens, the diameter D of the hub, and the length of the detector 30 with its housing as well.

The focal length f of the lens is thus the major component of the device length. The length f should be short for measuring the parameter $M^2$ in between close-set components of an optical train, and for reducing the mechanical requirements of the mounting needed to hold the lens rigidly relative to the hub and detector. On the other hand, the focal length f should be long to reduce lens aberrations. (There is a relationship between the hub diameter D and the lens focal length f, as taught by Johnston et al, at column 29, lines 20–25 and Table 1 of the '284 patent; they use a 20-cm focal-length lens.)

Of the various lens aberrations, spherical aberration is the most important. (Chromatic aberration is substantially unimportant for laser beams because they are highly monochromatic.) Spherical aberration varies as the inverse cube of f, so that doubling f reduces the spherical aberration by eight times. With a long focal length f, a simple and inexpensive plano-convex lens will have low enough spherical aberration to be used in a laser beam analyzer of the Johnston type.

For a given amount of spherical aberration (i.e., for a given optical quality), the cost of a lens goes up rapidly as f decreases. Conversely, for a fixed lens price the aberration increases as f shrinks. Thus, a physically short device of the Johnston type must use an expensive lens if the beam image is to be good enough for measuring the beam parameters near the beam waist.

If the device is to be used with various lasers having differing wavelengths, then the lens should also be adjustable, as taught by Johnson et al in the '284 patent, to optimize the performance of the device. In FIG. 27 and at column 38, line 43 et seq of the '284 patent, the patentees present a complex, multi-element telephoto design for the lens 32.

An alternative lens design, not taught by Johnston et al, is to use interchangeable lenses of simple plano-convex design. However, such lenses are limited to a focal ratio or f-ratio of f/16 or greater. ("f/16" means that the focal length f is 16 times the lens diameter.) Since the lens diameter must be about 1.5 times the beam width, the focal length f must be quite long.

The '284 patent teaches measurement of astigmatic beams in column 11, line 67 et seq. At column 17, line 17 it states that two knife edges at 90° to each other (each at 45° to the hub plane) "should" be used. This arrangement requires, if the angle of astigmatism is to be measured, that the entire device be made rotatable about the beam axis by means of a collet, as stated at column 17, line 64 and discussed at column 26, line 25 et seq. One embodiment is discussed at column 27, line 61.

The provision of a collet or other means for rotation about the beam axis complicates the mechanical structure and the measurement process. The main disadvantages of this approach are the high price of the moving lens system and the fact that not all laser or generic light beam parameters can be measured directly.

SUMMARY OF THE INVENTION

It is an object of the present invention to overcome deficiencies in the prior art, such as indicated above. It is another object of the present invention to provide an improved laser beam analyzer.

It is a further object of the present invention to provide improvements in the testing of laser systems and collimated light sources.

It is still another object of the present invention to provide an instrument for simultaneous measuring of various beam parameters such as spatial propagation of a Laser Beam; degree of collimation; optical power; optical power noise; beam intensity profile across the transverse area of the beam at any selected position; and beam intensity distribution across the transverse plane.

It is yet another object of the present invention to provide a device that is free of the above-noted disadvantages and automatically performs beam measurements which meet the requirements summarized in ISO/TC172/SC9 WG1, Project 2.

In accordance with the present invention, a one-element lens method and apparatus is disclosed, which is suitable for measuring the spatial propagation of a laser beam, the degree of collimation, beam optical power, beam optical power noise, beam intensity profile and beam intensity distribution.

In a laser beam analyzer of the type having a rotating-hub chopper and a detector, the present invention places the detector within the hub or drum rather than beyond it, and folds the beam path with mirrors or prisms to shorten the physical length of the device. This strengthens the mechanical and physical aspects of the system and allows the beam analyzer of the present invention to be placed within a short laser beam length between closely-spaced optical components.

The laser or light beam to be analyzed is passed through a lens mounted in a non-adjustable position on the frame or body of the analyzer. The refracted beam then intersects a reflector, which might be a glass binocular-type prism, a three-way right-angle retro-reflector, an arrangement of a mirror or mirrors, or the like. The reflector displaces the beam from the beam line and returns it preferably parallel to the original beam but in the opposite direction. This beam-folding arrangement shortens the physical device while retaining the same effective optical path length.

Instead of moving the lens, the present invention moves the reflector along a track. When the reflector is moved a distance x along its track, the distance along the folded optical path from the lens to the detector is changed by greater than that amount, e.g. double or two times, due to the beam folding. Because of this, the track for the reflector need only be half (or a fraction) as long as the corresponding track needed in the prior-art device which moves the lens.

Besides the halved focal length and halved track length, the offsetting of the beam in the present invention can also reduce physical length by removing elements from the beam line. The hub or measuring head may be located at the same position along$_9$ the beam as the lens, but offset from it.

The present invention may use multiple reflectors as well as a single reflector, if desirable.

The ISO standard allows beam waist measurements directly or indirectly. Indirect measurements are the cases where the beam waist may not be accessible. If the beam waist is virtual, or inside an inaccessible region, than the measurement of its location must be done by indirect means.

For these reasons, the international standard is based on the use of an aberration free focusing lens, and the use of a moving slit, a knife-ed9e or a variable aperture, as the primary means of beam width measurement.

The above mentioned ISO standard also defines beam conditioning, lenses and mirrors, under the informative Annex B, as follows:

B.1.1 Beam attenuation

The beam power or energy in the measurement region must be reduced below the level, where the detector saturation (or damage) occurs, but also as importantly below level where optical components are distorted by the thermal effects of the incident energy.

The way for distortion to the attenuator must not cause measurable changes in the measured beam diameters immediately after the attenuation train is exposed to the full power/energy being measured.

B.1.2 Beam focusing

The standard requires that a laser beam be brought to the real focus, using an aberration free (aberration shall not increase the focus beam width), focusing element of focal length known within 2% at the wavelength of interest.

Due to the fact that in accordance with the present invention the beam is folded and moved parallel to the incoming direction, beam conditioning requirements according to ISO standards are fulfilled, while the overall outside dimensions of the system are compact.

The invention preferably uses interchangeable plano-convex simple lenses with f-ratios greater than f/16.

A simple refracting lens or a single reflecting surface yielding a focused cone of f/16 or greater is acceptable. The focused beam must not be changed by the thermal absorption of the optical system.

The focusing leans element diameter must be at least 1.5 times the width of the beam incident on it. The beam conditioning requirements dictate a special lens with a very long focal length that makes the measuring instrument quite bulky and the beam attenuation requirements are very stringent.

BRIEF DESCRIPTION OF THE DRAWING

Other objects and the nature and and advantages of the present invention will become more apparent from the following detailed description of preferred embodiments taken in conjunction with the drawing wherein.

DESCRIPTION OF PREFERRED EMBODIMENTS

Figure 1:
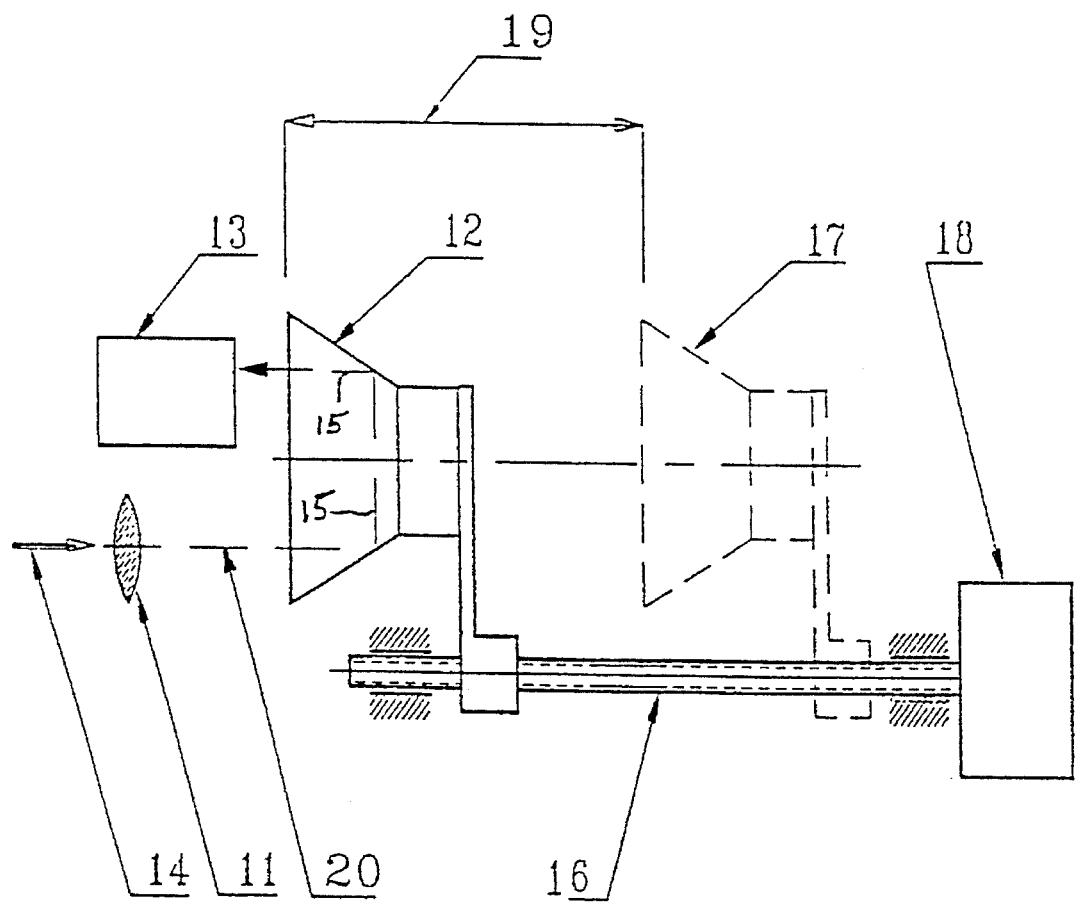
FIG. 1 is a schematic view of features of the invention.

In FIG. 1, an apparatus comprised of a removable lens 11, a moving retroreflector 12 and a removable measuring head 13 is disclosed. An incoming beam 14 is focused by the lens 11. The transmitted beam 15 is folded by means of retroreflection. The folding of the beam allows a compact sized system along the beam propagation direction. The moving retroreflector 12 moves the transmitted beam 15 to the measuring area and allows measuring of various transverse planes along the beam.

A linear slide 16 controlled by a step motor 18 is provided in order to linearly displace the retroreflector 12. The displaced retroreflector is schematically shown in phantom at 17, and its linear stroke 19 changes the optical path 20 inside the instrument to vary linearly. The optical path length in the embodiment is equal to twice the retroreflector's linear stroke. The aforementioned linear movement enables measuring the beam at different locations along its propagation axis. The measured results are used for further processing and determining beam quality, using formula A, given above.

By removing the lens, the beam reaches the measuring head directly. By moving the retroreflector, or other folding mirror means, various planes along the beam can be measured. This information is used for further processing and calculation of real beam quality and collimation.

The measuring head 13 has a rotating drum with multiple knives or slits which scan the beam along the transverse plane and generate intensity profiles at various scanning angles. The knife edges intersect the beam at more than two angles, allowing direct computation of the higher-order parameters of the beam and measurement of the angle of maximum astigmatism without having to rotate the apparatus about the beam line axis, which rotation is required by prior-art devices having only two knife-edge angles. The information collected from the rotating knives, when reconstructed by known and/or routinely derivable tomographic algorithms, generates the beam intensity distribution across the transverse plane.

In the present invention, beam attenuation is achieved by placing a filter behind the rotating drum and in front of the detector, thus achieving beam attenuation without disturbing the quality of the measurement.

Figure 3A:
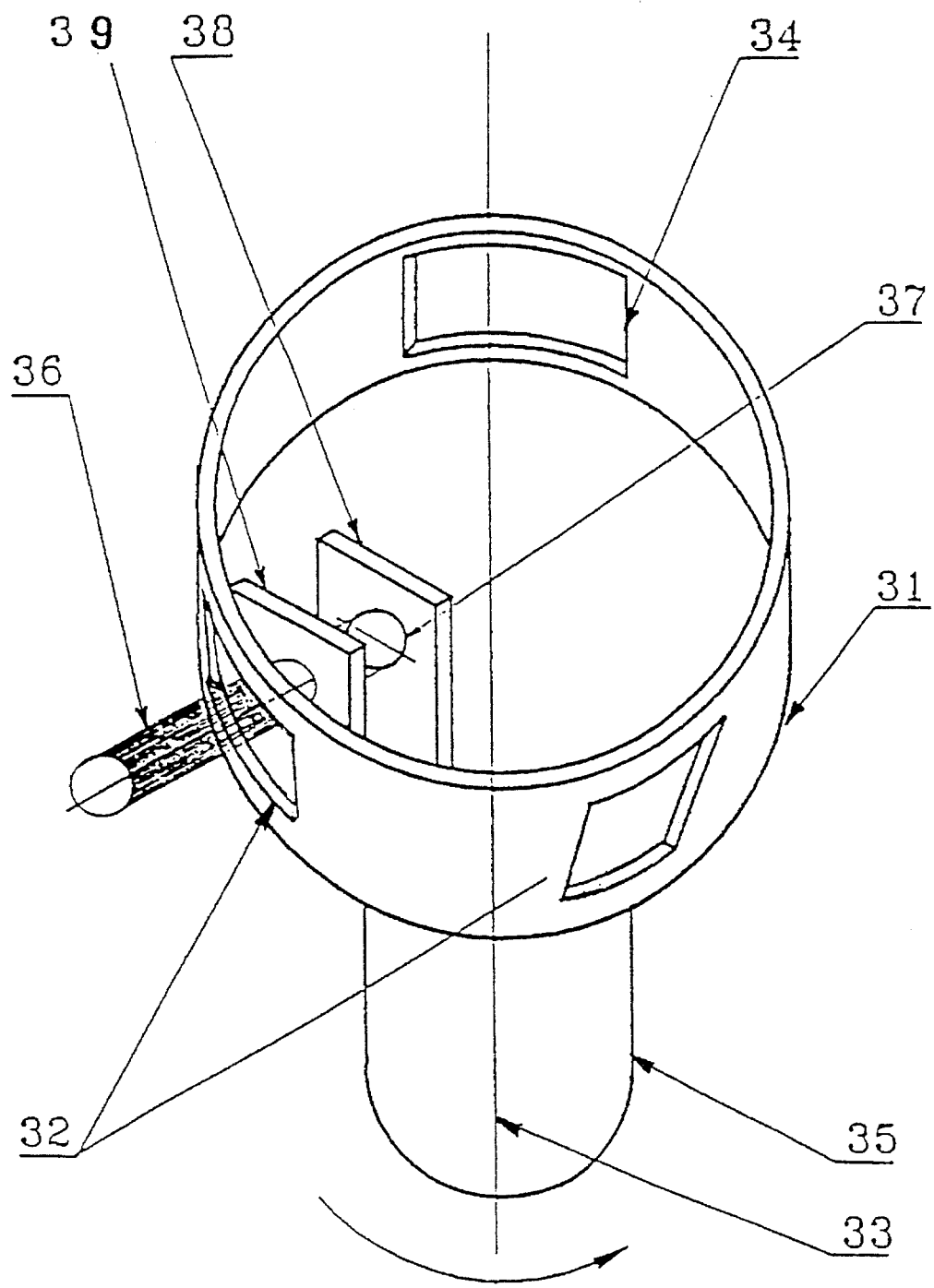
FIG. 3A is a perspective view of the drum with moving knife edges.

For example, referring to FIG. 3A, a rotating drum 31 has knife-edge windows 32' which allow a beam 36 to enter the interior of the drum 31. A stationary filter 39 is placed in the beam line just behind the rotating knife edges inside the drum of the measuring head and in front of a detector 38; the filter 39 does not rotate with the drum 31. This placement has the advantage that the measurement will not be affected by beam distortion in the filter, whether the distortion is due to the original optical quality of the filter or thermal effects due to heating of the filter. Removing the measuring head 13 and replacing it with a CCD camera allows similar measurements to be made.

The measurements are, in effect, performed in the plane of the rotating knives. The beam is neither attenuated nor distorted until it reaches the measuring area, which is the area of the rotating knives. The eclipsed beam, after passing the knives, is attenuated before the detector. Any distortion introduced at this stage has no effect whatsoever on beam measurement accuracy. Prior-art attenuation techniques, in which the attenuator is disposed in the beam path ahead of the knife edge, may induce distortion and aberrations that cause erroneous measurements.

Figure 2A:
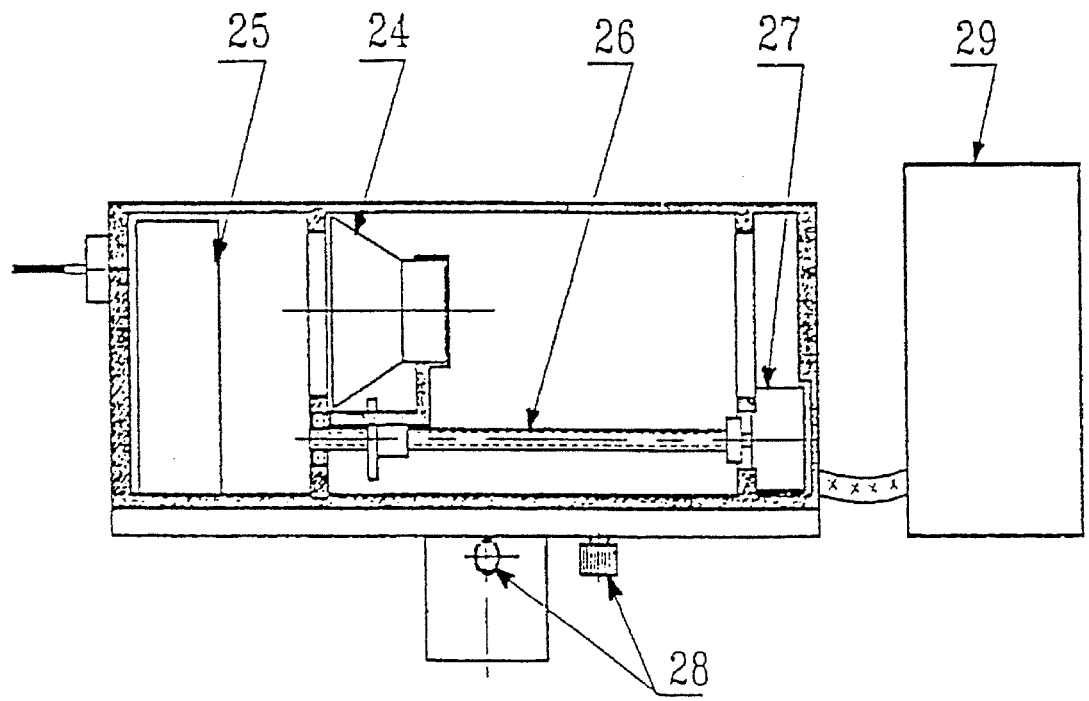
FIG. 2A is an elevational view of an embodiment of the invention and FIG. 2B is a schematic plan view thereof.
Figure 2B:
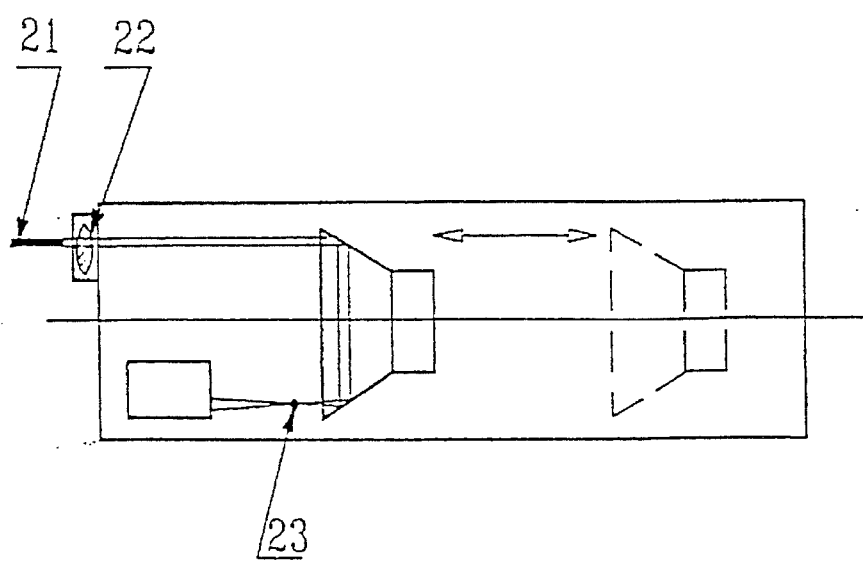

FIGS. 2A and 2B show an embodiment of a Laser Beam Analyzer according to the present invention, respectively side view and top view. A laser beam 21 entering the lens aperture 22 creates a transmitted beam 23 of the beam propagation in space. The lens 22 is a high-quality, preferably plano-convex lens, meeting the requirements of the proposed ISO standard of f/16 or higher, thus having a long focal length. The transmitted beam 23 is folded and reflected by a mirror arrangement, e.g. the retroreflector 24. This element is a corner, formatted by three mirrors perpendicular to each other, having optical characteristics such that an incoming beam is reflected back, parallel to the incoming direction, and its displacement is linear.

Other folding means are possible and the retroreflector means is disclosed by way of example only without limitations for any other folding means.

The reflecting element has the following main functions: folding the transmitted beam 23 and projecting it within the measuring area of the measuring head 25. The retroreflector 24 is mounted on a linear slide element 26, and the motor 27 provides the necessary linear motion. A special knob 28 is provided in order to adjust the head's angular orientation with respect to the incoming beam. The system is controlled by a controller unit 29.

Figure 3B:
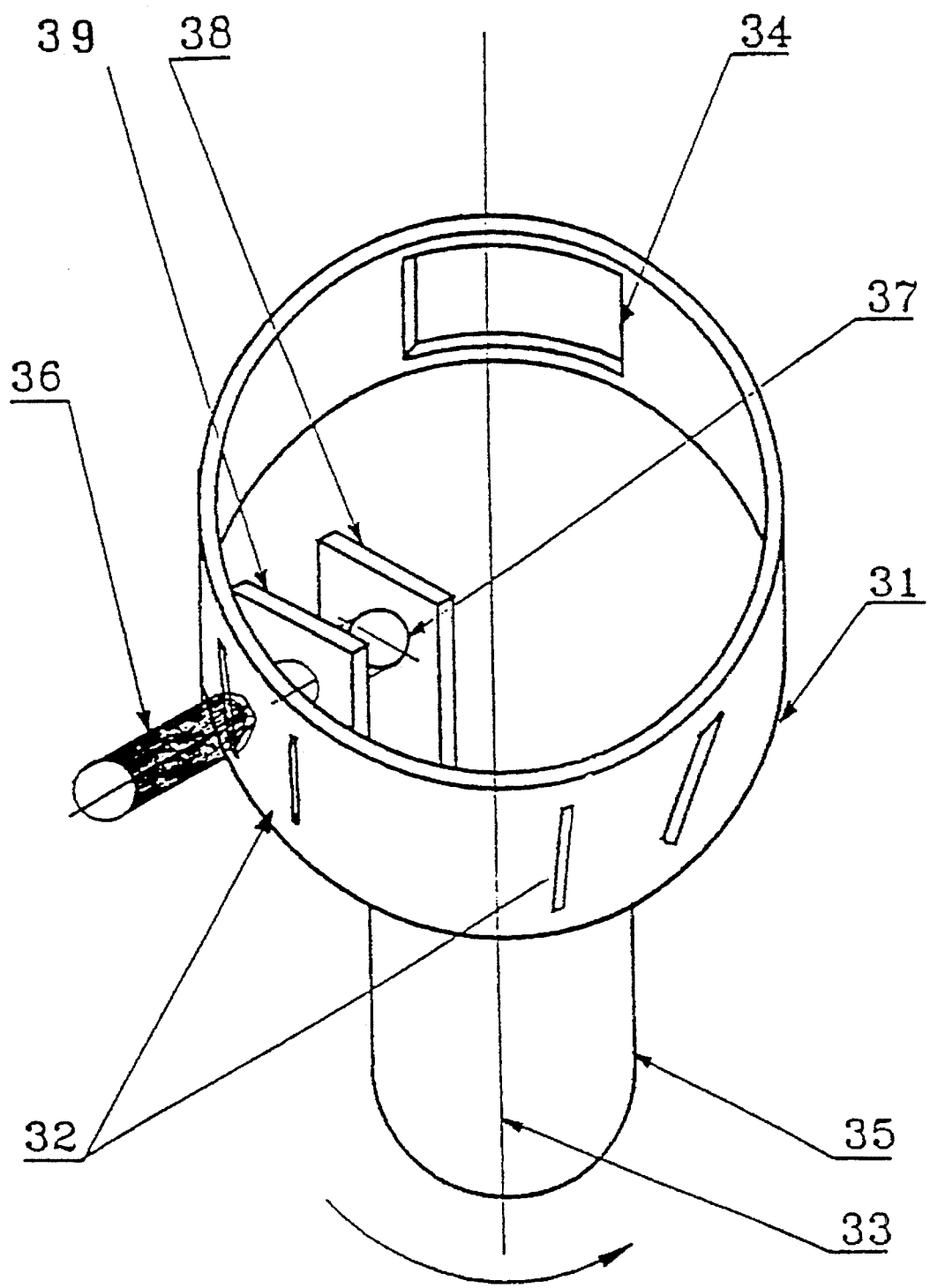
FIG. 3B is a perspective view of the drum with slits.

FIGS. 3A and 3B show a detailed drawings of embodiments of the measuring head. The measuring head is composed of a rotating drum 31 with multiple thin slits 32 (FIG. 3B) or knife-edges 32'(FIG. 3A) mounted on its perimeter. The more knife edge angles that are provided, the more different sweeps of the beam are available for each rotation of the drum 31 and the more accurate an analysis of the beam is possible. With more than two knife edge angles, the requirement of providing a rotating collet (as taught by the prior art) is done away with. Instead of manual rotation of the device, mathematical analysis based on the increased amount of information from the several edges can be performed; such analysis is well known in the art.

For example, in measuring beam astigmatism two perpendicular measurements, as taught by the prior art, cannot give the azimuth angles (angle of maximum astigmatism). In fact, such measurements could falsely measure an astigmatic beam to be circularly symmetric (by measuring at 45° on either side of the azimuth or maximum). If three measurements are taken, at various angles, this mistake would be impossible.

The moving knife edge method is discussed in ISO/TC 172/SC 9/WG1 (Nov. 26, 1993) Annex § A.2, which states (at A.2.1): "When dealing with elliptical beams the moving direction of the knife edges has to be chosen to coincide with the two principal beam axes." Also, at § A.2.5 this ISO document states that with non-cylindrically symmetrical beams "two orthogonal moving directions for which the uncorrected beam widths are equal" must be determined.

Hyperbolic fitting, with three-parameter formulae, is discussed in the ISO standard § 8. These hyperbolic formulae give the beam waist widths.

In general, the more different angles of the knife-edge that are provided, the better the measurement of the astigmatism. Moreover, higher-order properties of the beam such as the second moments can easily be measured by mathematically correlating measurements made at three or more knife-edge angles. Second moments cannot be obtained from measurements at only two angles.

The present invention preferably includes three or more different angles of knife-edge 32. Numbers up the maximum allowed by the mechanical constraints Of designing the drum 31 are contemplated. For example, edges at 0°, 15°, 30° . . . , may be employed.

If slits 32 are used (FIG. 3B), instead of windows bordered by knife-edges (FIG. 3A), then the slits formed by pairs of closely adjacent knife-edges should also be variously angled. (Of course, if pinholes are used in the present invention this is moot.) Slits 32 are depicted in FIG. 3B.

There are several advantages to the mathematical analysis of the present invention over the manual/mechanical methods of the prior art. The expense, additional inaccuracy, and fragility of a mechanical bearing and locking device are eliminated, while no extra mathematical calculating equipment (computer hardware) need be provided.

The various scanned intensity profiles from the corresponding various angled edges are measured in quick succession, almost simultaneously, so that the measurements are less likely to suffer from drift. By way of contrast, the prior-art manual rotation requires a relatively long time during which the beam profile might drift due to laser instability, vibration, accident, or misalignment caused by the act of rotating the device.

The drum rotates along the drum axis of rotation 33. A special wide opening 34 is made on the drum, for direct power measurements. If desired, the present invention can eliminate the window 38 of the prior art, since the detector is located inside the hub or measuring head drum and there is no need for a beam exit. This is an advantage with high-powered lasers which may overheat the detector. With only a single aperture in the hub, the exposure of the detector to the beam may be reduced by more than twice over the exposure of the prior-art device of Johnston et al.

The incoming beam 36 is cut by the knife-edges 32' as they pass through the beam, and the beam passing through 37 is partially obscured by the drum wall. The obscured beam (37) incident on the detector 38 generates a signal according to its passing power.

An additional attenuations means 39 is provided, usually an optical filter, for filter mounting behind the rotating drum and in front of the detector. The use of a beam attenuation filter to reduce the power dissipation requirements of the detector allows more powerful laser beams to be analyzed.

Because the measurement is performed by the drum rotation, even if the filter aberrates the incoming beam, it will not affect the image quality, thus satisfying the ISO standard, section B.i.1, "Beam Attenuation".

Figure 4A:
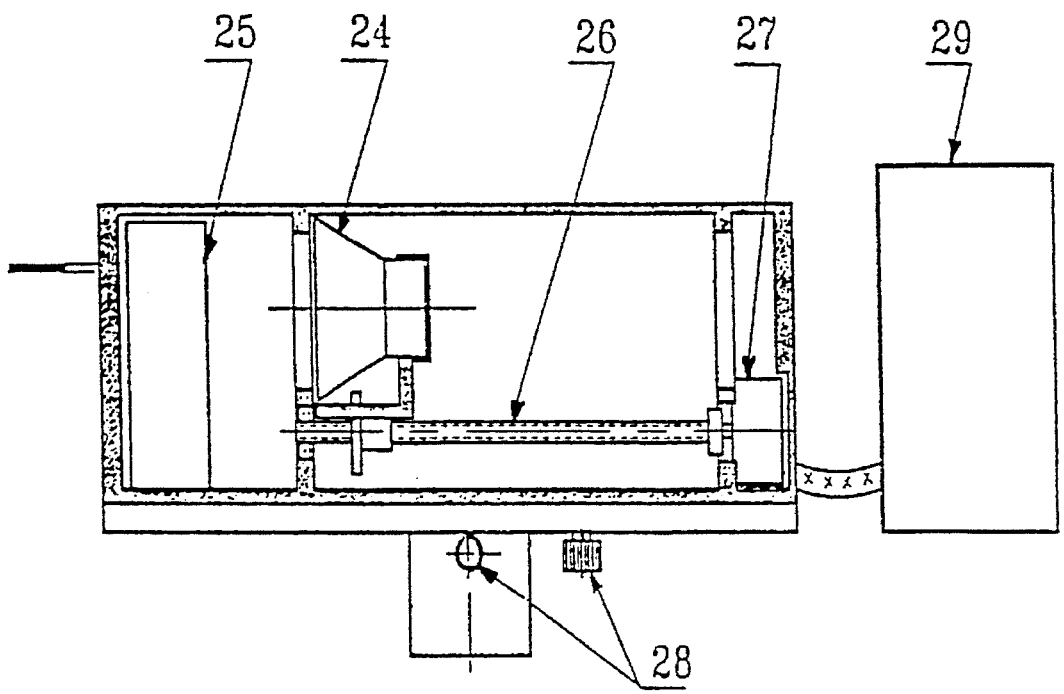
FIG. 4A is an elevational view of an embodiment of the invention, with FIG. 4B being a schematic plan view thereof.
Figure 4B:
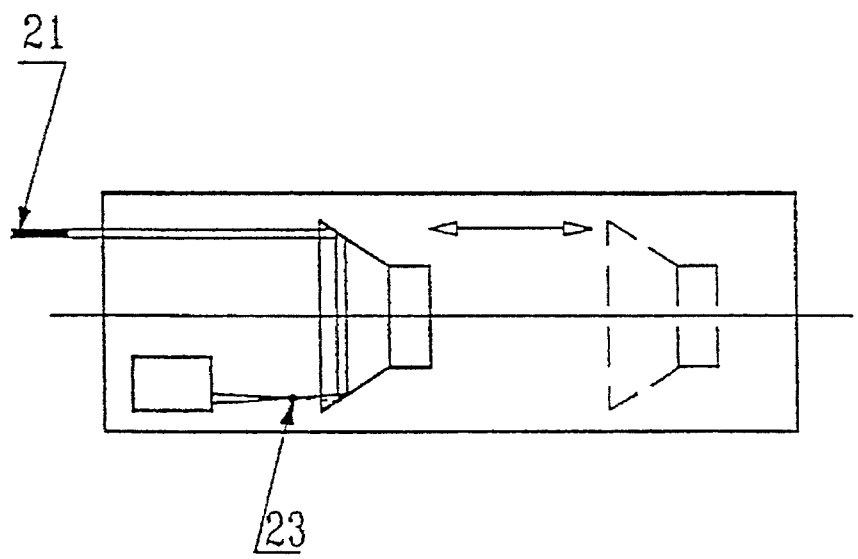

FIGS. 4A and 4B show an otherwise similar apparatus, but where the lens is removed, enabling direct measuring of the incoming beam. The principal operation here is similar to the one disclosed in FIG. 2.

The ISO standard calls for direct and also indirect measurements of the beam at several locations perpendicular to the beam propagation axis. "Direct" measurements must be made without a focusing lens in the beam path. Moreover, the ISO standard calls for direct measurements to be made at various points along the beam. With prior-art device, no practical way of moving the measuring head with respect to the beam is provided. In contrast, the present invention allows direct measurements to be easily made at various places along the beam by simply moving the retroreflector.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The term "means" as used herein and in the claims is intended to cover not only the structures specifically disclosed and equivalents thereof, but also structures and device which can effect a similar and/or equivalent function in the claimed environment.

What is claimed is:

1. An apparatus for measuring the beam parameters of a laser beam, the apparatus comprising:

focusing means for focusing the beam and creating a transformed beam waist;

a plurality of knife-edges, said plurality being more than two;

sweeping means for sweeping each of the knife-edges across the beam at a cut adjacent the beam waist;

the knife-edges being disposed selectively at a number of various angles to a knife edge sweep direction at the cut, the number being greater than two;

detector means for measuring beam power, the detector means being positioned to intercept the beam in a position such that the knife-edges chop the beam intermediate the detector and the focusing means;

frame means for supporting the focusing means, the sweeping means, and the detector means, and for holding the focusing means and the sweeping means at a selected distance apart; and processor means, coupled to the detector means, for determining the beam parameters from different changes of the beam power at the detector due to sweeps of the knife-edges at the various angles.

2. The apparatus according to claim 1, further including a reflector for deflecting the beam away from a beam line.

3. The apparatus according to claim 2, wherein the reflector includes at least two reflecting surfaces and the beam is deflected through an angle of 180° degrees, such that a reflection of the beam is reversed and offset from the beam.

4. The apparatus according to claim 3, wherein the detector means is offset from the beam.

5. The apparatus according to claim 2, wherein the frame means further includes a carriage mounted for linear motion along a track line of the frame parallel to the beam and the reflector means.

6. The apparatus according to claim 1, further including a beam attenuator mounted intermediate the knife-edge and the detector.

7. The apparatus according to claim 1, wherein each one of the plurality of the knife-edges is mounted on a generally cylindrical rotating drum and the detector means is disposed within the drum, such that at least three different measurements of the beam may be made in each rotation of the drum.

8. The apparatus according to claim 7, wherein each one of the plurality of the knife-edge borders a window through a side wall of the rotating drum.

9. The apparatus according to claim 7, wherein each one of the plurality of the knife-edge borders a slit through a side wall of the rotating drum, the slit formed by the one and an other one of the plurality of the knife-edge, the other one disposed parallel to the one.

10. The apparatus according to claim 7, wherein the means is detector disposed within the drum.

11. The apparatus according to claim 10, wherein the focusing means is demountable.

12. The apparatus according to claim 7, wherein the detector means further includes a charge coupled device camera.

13. The apparatus according to claim 7, wherein the detector further includes data acquisition and computing means for beam measurement.

14. The apparatus according to claim 7, wherein the detector means further includes data acquisition and computing means for image reconstruction.

* * * * *